United States Patent [19]

Zviak et al.

[11] 3,919,419
[45] Nov. 11, 1975

[54] INSECTICIDAL COMPOSITION CONTAINING DIMETHYL DICHLOROVINYL PHOSPHATE AND A POLYMER OF POLYETHYLENE FATTY ACID

[75] Inventors: Charles Zviak, Franconville; Jean Daeninckx, Saint-Denis, both of France

[73] Assignee: Societe Anonyme dite: L'Oreal, Paris, France

[22] Filed: May 14, 1971

[21] Appl. No.: 143,593

[30] Foreign Application Priority Data
May 19, 1970 Luxemburg............................ 60931

[52] U.S. Cl................................. 424/219; 424/16
[51] Int. Cl.$^2$............................................ A01N 9/36
[58] Field of Search .......... 424/219, 78, 16; 239/34; 21/60.5, DIG. 8

[56] References Cited
UNITED STATES PATENTS

| | | | |
|---|---|---|---|
| 2,490,437 | 12/1949 | Hillyer | 424/173 |
| 2,793,219 | 5/1957 | Barrett et al. | 260/407 |
| 2,793,220 | 5/1957 | Barrett et al. | 260/407 |
| 3,127,235 | 3/1964 | Benzel | 21/60.5 |
| 3,461,201 | 8/1969 | Champion | 424/125 |

FOREIGN PATENTS OR APPLICATIONS

| | | |
|---|---|---|
| 1,275,294 | 1961 | France |
| 903,159 | 8/1962 | United Kingdom |

*Primary Examiner*—Frederick E. Waddell
*Attorney, Agent, or Firm*—Cushman, Darby & Cushman

[57] ABSTRACT

An insecticidal composition comprises a homogeneous solution of dimethyl dichlorovinyl phosphate and a polymer of polyethylene fatty acid present in amounts sufficient to stabilize and to control the evaporation rate of the dimethyl dichlorovinyl phosphate. Absorbent supports can be impregnated with this insecticidal composition.

5 Claims, No Drawings

INSECTICIDAL COMPOSITION CONTAINING DIMETHYL DICHLOROVINYL PHOSPHATE AND A POLYMER OF POLYETHYLENE FATTY ACID

This invention relates to a novel insecticide composition and, more particularly, to an insecticidal composition comprising a homogeneous solution of dimethyl dichlorovinyl phosphate and a polymer of a polyethylene fatty acid or a derivative thereof present in amounts effective to stabilize said dimethyl dichlorovinyl phosphate and to control or retard the rate of evaporation thereof.

The insecticidal properties of the compounds such as vinyl dialkylphosphates, their halogen addition products and vinyl dialkylphosphorothioates are well known. Of these compounds, the one most often used at the present is dimethyl dichlorovinyl phosphate, commonly designated by the abbreviation DDVP. This compound functions by releasing its vapors by evaporation, which vapors are toxic to insects. The extent of the zone of toxic vapors depends particularly on the amount of vapor emitted by DDVP, which in turn is dependent on the surface area of the DDVP exposed to the atmosphere.

DDVP, whose chemical and physical properties are well known, is considered a relatively unstable compound and, in the presence of water, water vapor or traces of heavy metals, for example, it has a tendency to decompose partially into secondary chloro products which have a rather strong odor.

This degradation entails a rapid loss of the insecticidal activity of DDVP and is, as indicated above, particularly notable when the atmosphere is heavily charged with water vapor.

Consequently, the effectiveness of a DDVP-based insecticide composition depends directly on the conditions under which this compound evaporates into the atmosphere.

To increase the evaporation surface of DDVP it has already been proposed to impregnate an absorbent material such as a powder or a fabric with DDVP in liquid form. However, the results have not been totally satisfactory because the insecticidal effect has been noted to rapidly cease or diminish because of rapid evaporation of the DDVP. Further, this rapid evaporation creates a further disadvantage in that the zone in the vicinity of the evaporation surfaces exhibit too high a DDVP content, which is considered either bothersome or dangerous.

In an attempt to remedy these various disadvantages, it has also been proposed to introduce DDVP as a plasticizer in a polyvinyl chloride cake, prepared under special conditions to permit the DDVP to migrate slowly to the surface of the cake where it progressively evaporates into the atmosphere.

While these efforts make it possible to limit, to a certain extent, a too rapid evaporation of DDVP, and thereby, prolong its action in time, this type of insecticide nevertheless presents a major disadvantage in that at the end of use there is generally always a considerable amount of DDVP remaining in the cake which is then thrown out while it is still emitting toxic fumes.

It has also been proposed to use DDVP in combination with animal or vegetable oils and fats in an effort to retard or delay its rate of evaporation and to inhibit or reduce its decomposition.

The oils generally used are cottonseed oil, linseed oil or sunflower seed oil. These oils are drying or semi-drying oils so that on drying they imprison the DDVP. Consequently, there is a resulting reduction of the insecticidal activity and, moreover, the drying characteristics of the oils, which is a direct result of oxidation, involves considerable degradation of the DDVP.

It is therefore a general object of the present invention to overcome the disadvantages of prior art insecticidal compositions based on DDVP by providing a novel composition which is easy to use and which offers effective and lasting protection against insects.

More particularly, the present invention has for an object the provision of a novel industrial product which is a novel, stable and long-lasting insecticidal composition comprising a homogeneous solution of dimethyl dichlorovinyl phosphate (DDVP) and a polymer of a polyethylene fatty acid or a derivative thereof present in amounts effective to stabilize the DDVP and to control, i.e. reduce its rate of evaporation.

Polyethylene fatty acid polymers, used according to the present invention, are fatty polyacids, with a relatively high molecular weight, generally between 500 and 1000 and are produced by the polymerization of polyethylene fatty acids.

These fatty acids are, more particularly, acids of $C_{18}$ comprising two or three double bonds. Representative fatty acids include linoleic acid and linolenic acid.

Generally, the polymers of polyethylene fatty acids employed are principally in the form of dimers or trimers of linoleic or linolenic acid and as such have a viscosity ranging generally between 900 and 1200 poises. They are practically colorless and have great stability despite their lack of saturation. This stability is especially very marked in regard to temperature and oxygen. In addition, they have a very slight volatility.

The production of these dimers and trimers of linoleic and linolenic acids is generally performed in two stages. In the first stage products rich in these acids such as, for example, cottonseed oil, soy oil, linseed oil and fish oil are catalytically isomerized.

In these oils, these acids are most often in the form of triglycerides, but in general the isomerization is more particularly realized on methyl, ethyl, propyl or butyl esters of these acids.

The isomerization conditions and the characteristics of the products obtained are described in French Pat. No. 1,275,294.

The purpose of this isomerization is to convert the linoleic and linolenic acids, unconjugated ethylene acids, into conjugated ethylene acids.

The linoleic acid is thus isomerized into octadiene-9,11 oic acid and the linolenic acid into octadecatriene-10,12,14 oic acid.

In the second stage, known as polymerization, or again dimerization or trimerization, these acids thus isomerized, are polymerized generally by heating the same to about 100–300°C which makes it possible to obtain, in variable ratios, dimers or trimers of isomerized linoleic or linolenic acids.

Studies have shown that the dimers and trimers actually resulted from a diene synthesis (Diels-Alder reaction), the isomerized linoleic and linolenic acids acting either as dienophile compounds or phylodiene compounds.

Methods relating to the polymerization of polyethylene fatty acids are described, for instace, in U.S. Pat. Nos. 2,793,219; and 2,793,220.

The article of Fieser & Fieser in Organic Chemistry (1944), pages 399–400 gives a possible reaction schema to obtain these polyacid polymers.

Determination of the approximate proportions of dimers and trimers, after polymerization, can be achieved by first distilling, under pressure, the monomers that have not reacted and the other constituents of the starting product, then by changing the mixture of dimeric and trimeric acids into their corresponding esters and then finally, by reducing these latter into glycol.

The dimer glycols can then be distilled under pressure and at high temperature leaving trimer glycols as residues.

As has been indicated above, the percentages of dimers and trimers, depend essentially on the starting products.

It should also be noted that such polymers of polyethylene fatty acids can be obtained by an ion type polymerization by using a process such as described in "la revue francaise des Corps Gras" [ French Review of Fatty Bodies], 15 (3), 1968, page 149.

The presence of a polymer of polyethylene fatty acid makes it possible to prevent the degradation of the DDVP, and thereby considerably prolong the period of its effectiveness.

In accordance with the present invention, the amount of polyethylene fatty acid utilized in the insecticidal composition is generally between 1 and 99% by weight of the total composition and, preferably, between 40 and 60%. It is clear that if it is desired to obtain fast and effective insecticidal activity or, on the contrary, an extended insecticidal activity, the concentration in the composition of the polyethylene fatty acid polymer can be varied.

The present invention also has for an object the provision of a novel industrial product which comprises an insecticidal cake or slab comprising an absorbent support impregnated with the insecticidal composition of the present invention.

According to the present invention, a great variety of materials can be used as the absorbent support. Representative of such materials are felts or fabrics made from, for instance, asbestos and cotton, the supports being provided in any desired size or geometric shape, since neither the size nor the shape constitutes an essential characteristic of the present invention.

The absorbent is generally impregnated with about 1 to 5 times, and preferably 2 to 4 times, its own weight of the insecticidal composition according to the invention.

Tests made by the applicants have shown that the cakes or slabs impregnated with the homogeneous insecticidal composition of the invention, and protected in a fluid-tight packaging, can be kept for several months in a stove containing air at 40°C without producing, after opening of the package, the odors characteristic of chlorine products which generally indicate a considerable decomposition of the DDVP.

Other tests performed have shown that the insecticidal cakes, according to the present invention, retain their insecticidal power for at least three to four months.

From these tests, it is clear therefore that the polyethylene fatty acid polymer plays a double role:

1. it acts as a DDVP evaporation retardant, thereby extending the effective life of the latter; and 2. it acts as a DDVP stabilizer, particularly when this insecticide is in an environment where the rate of humidity is very high.

According to a variant of the invention, it is also possible with polymers of polyethylene fatty acids to stabilize and increase the effective life of the insecticides made up of a mixture of bodies similar to DDVP, and other insecticides such as, for example, polychloroterpenes which can be used to increase the viscosity of the DDVP.

The polychloroterpenes which are known contact insecticides are sold particularly by Goodrich Chemical under the name "Strobane".

For a better understanding of the invention, there will now be described, by way of illustration and without any limiting character, several embodiments given below as examples.

In these examples, there were used as the polymer of a polyethylene fatty acid the "polymerginic acids" sold by Harbuger Fettchemie Brinckmann & Mergell G.m.b.H. These "polymerginic acids" are "dimerginic acid 75/25" having a ratio % dimers/% trimers equal to 75/25 and "trimerginic acid 10/90" having a ratio % dimers/% trimers equal to 10/90, these dimers and trimers being respectively those of isomerized linoleic and linolenic acids. A "dimerginic acid 80/20" sold by the same firm also was used in certain examples. The "dimerginic acid" and "trimerginic acid" can be used alone or in a mixture.

EXAMPLE 1

An absorbent slab of asbestos and unoriented cotton, in parallelepipedic form, and having a surface of 150 $cm^2$ and a weight of 10 g, is impregnated with 30 g of the following homogeneous mixture:

| | |
|---|---|
| DDVP | 50 g |
| "dimerginic acid 75/25" | 50 g |
| acid value | 185–194 |
| saponification value | 190–199 |
| viscosity at 20°C | 950–1100 poises |
| coloring (Gardner) | Max. 12. |

The resulting slab is placed in a room of about 30 $m^3$ and exhibits effective insecticidal power for a period generally more than 3 months.

EXAMPLE 2

An absorbent felt support whose constituents are slightly bound by a thermosetting resin, weighing 12 g and having a surface of 200 $cm^2$, is impregnated with 60 g of the following homogeneous mixture:

| | |
|---|---|
| DDVP | 40 g |
| "trimerginic acid 10/90" | 60 g |
| acid value | 183–193 |
| saponification value | 185–197 |
| viscosity at 20°C | 960–1200 poises |
| coloring (Gardner) | Max. 12. |

This slab provided excellent environmental insecticidal activity for a period of about 3 months.

EXAMPLE 3

An absorbent slab of asbestos and unoriented cotton in parallelepipedic form, having a surface of 150 $cm^2$ and a weight of 10 g, is impregnated with 30 g of the following homogeneous mixture:

| DDVP | 50 g |
|---|---|
| "dimerginic acid 75/25" | 25 g |
| "trimerginic acid 10/90" | 25 g |

The slab thus formed, when placed in a room of about 30 m³, exhibits effective insecticidal activity for a period generally greater than 3 months.

EXAMPLE 4

An absorbent slab made of asbestos and oriented cotton, in parallelepipedic form, having a surface of 50 cm² and a weight of 3.5 g, is impregnated with 12 g of the following homogeneous mixture:

| DDVP | 40 g |
|---|---|
| "dimerginic acid 75/25" | 40 g |
| "trimerginic acid 10/90" | 20 g |

The slab thus formed is provided with a protective screen and closed on one of its faces by an adhesive vellum paper to insure slower evaporation of the DDVP. The slab provided excellent moth insecticidal activity for closets and wardrobes.

EXAMPLE 5

An absorbent slab of asbestos and oriented cotton, in parallelepipedic form, having a surface of 150 cm² and a weight of 10 g, is impregnated with 30 g of the following homogeneous mixture:

| DDVP | 60 g |
|---|---|
| "dimerginic acid 75/25" | 20 g |
| "trimerginic acid 10/90" | 20 g |

This slab exhibited effective insecticidal activity for about 2 months.

EXAMPLE 6

An absorbent felt, whose constituents are slightly bound by a thermosetting resin, weighing 12 g and having a surface of 200 cm², is impregnated with 60 g of the following homogeneous mixture:

| DDVP | 40 g |
|---|---|
| "dimerginic acid 75/25" | 30 g |
| "trimerginic acid 10/90" | 30 g |

This slab exhibited excellent environmental insecticidal activity for a period of about 3 months.

EXAMPLE 7

An absorbent felt, whose constitutents are slightly bound by a thermosetting resin, weight 12 g and having a surface of 200 cm² is impregnated with 60 g of the following homogeneous mixture:

| DDVP | 40 g |
|---|---|
| "dimerginic acid 75/25" | 20 g |
| "trimerginic acid 10/90" | 20 g |
| "Strobane" (mixture of camphor, pinene and polychloro homogeneous terpenes) molecular weight: about 380-density 1.638 at 25°C. vapor pressure 0.3 millicrons at 20°C | 20 g |

This slab exhibited excellent environmental and contact insecticidal activity for a period of about 3 to 4 months.

EXAMPLE 8

An absorbent slab made of asbestos and oriented cotton, in parallelepipedic in form, having a surface of 150 cm² and a weight of 10 g, is impregnated with 30 g of the following homogeneous mixture:

| DDVP | 60 g |
|---|---|
| "dimerginic acid 80/20" | 40 g |
| acid value | 183–193 |
| saponification value | 185–197 |
| viscosity at 20°C | 900–1150 poises |
| coloring (Gardner) | Max. 12 |

This slab exhibited effective insecticidal activity for about 2½ months.

EXAMPLE 9

An absorbent felt, whose constituents are slightly bound by a thermosetting resin, weighing 12 g and having a surface of 200 cm² is impregnated with 60 g of the following homogeneous mixture:

| DDVP | 45 g |
|---|---|
| "dimerginic acid 80/20" | 30 g |
| "trimerginic acid 10/90" | 25 g |

This slab exhibited excellent environmental insecticidal activity for a period of about 3 months.

What is claimed is:

1. A stable and long lasting insecticidal composition comprising a homogeneous solution consisting essentially of dimethyldichloro vinyl phosphate and 40–60 percent by weight of a mixture of dimers and trimers of $C_{18}$ fatty acids selected from the group consisting of linoleic and linolenic acid.

2. The insecticidal composition of claim 1 wherein said dimers and trimers have a molecular weight between 500–1000. Serial No. 143,593

3. The insecticidal composition of claim 1 wherein said dimers and trimers have a viscosity between 900–1,200 poises at 20°C.

4. The insecticidal composition of claim 1 wherein the proportion by weight of dimers in said mixture ranges between 10–80% and the proportion of trimers ranges between 20–90%.

5. A stable and long lasting insecticidal composition comprising a homogeneous solution consisting essentially of dimethyl dichlorovinyl phosphate and 40–60 percent by weight of said composition of a mixture of dimers and trimers of $C_{18}$ fatty acids selected from the group consisting of linoleic and linolenic acid, said dimers being present in said mixture in amounts ranging between 10–80 weight percent thereof, said trimers being present in amounts ranging between 20–90 weight percent thereof, said dimers and trimers having a molecular weight ranging between 500–1000 and having a viscosity ranging between 900–1,200 poises at 20°C.

* * * * *

UNITED STATES PATENT OFFICE
CERTIFICATE OF CORRECTION

Patent No. 3,919,419　　　　　　　　Dated November 11, 1975

Inventor(s) Charles Zviak and Jean Daeninckx

It is certified that error appears in the above-identified patent and that said Letters Patent are hereby corrected as shown below:

Column 6, line 43, (end of Claim 2) delete "Serial No. 143,593".

*Signed and Sealed this*

Seventeenth *Day of* August 1976

[SEAL]

*Attest:*

RUTH C. MASON
*Attesting Officer*

C. MARSHALL DANN
*Commissioner of Patents and Trademarks*